United States Patent
Bietz et al.

(10) Patent No.: US 11,094,477 B2
(45) Date of Patent: Aug. 17, 2021

(54) TENSIONING GEAR MECHANISM FOR TENSIONING A STORED-ENERGY SPRING OF A SPRING-TYPE STORED-ENERGY DRIVE

(71) Applicant: SIEMENS ENERGY GLOBAL GMBH & CO. KG, Munich (DE)

(72) Inventors: Marian Bietz, Berlin (DE); Michael Bartz, Berlin (DE); Lukas Binner, Berlin (DE); Gunnar Lutzke, Berlin (DE); Friedrich Loebner, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/648,301

(22) PCT Filed: Aug. 23, 2018

(86) PCT No.: PCT/EP2018/072792
§ 371 (c)(1),
(2) Date: Mar. 18, 2020

(87) PCT Pub. No.: WO2019/057438
PCT Pub. Date: Mar. 28, 2019

(65) Prior Publication Data
US 2020/0273638 A1    Aug. 27, 2020

(30) Foreign Application Priority Data
Sep. 22, 2017    (DE) .............................. 102017216805

(51) Int. Cl.
*F03G 1/08*    (2006.01)
*F16H 33/02*    (2006.01)
*H01H 3/30*    (2006.01)

(52) U.S. Cl.
CPC ............. *H01H 3/3005* (2013.01); *F03G 1/08* (2013.01); *F16H 33/02* (2013.01); *H01H 3/3031* (2013.01); *H01H 2003/3036* (2013.01)

(58) Field of Classification Search
USPC ........................................................ 200/400
See application file for complete search history.

(56) References Cited

U.S. PATENT DOCUMENTS

| 2,924,180 A | 2/1960 | Maillard |
| 2008/0202910 A1 | 8/2008 | Lutzke |

(Continued)

FOREIGN PATENT DOCUMENTS

| CN | 106783254 A | 5/2017 |
| DE | 10324196 A1 | 12/2004 |

(Continued)

*Primary Examiner* — Rexford N Barnie
*Assistant Examiner* — Xuan Ly
(74) *Attorney, Agent, or Firm* — Laurence Greenberg; Werner Stemer; Ralph Locher

(57) ABSTRACT

A charging mechanism charges a stored-energy spring of a stored-energy spring mechanism. The charging mechanism contains a charging gear coupled to the stored-energy spring, an intermediate shaft coupled to the charging gear, an idler gear, a freewheel coupled to the idler gear, a locking mechanism for releasably locking the charging gear in a charged state of the stored-energy spring, and a dog clutch that couples the freewheel to the intermediate shaft to charge the stored-energy spring and uncouples same from the intermediate shaft in the charged state of the stored-energy spring. The dog clutch contains a first clutch block that is non-rotatably coupled to the intermediate shaft, a second clutch block connected to the freewheel, and a synchronizer ring disposed between the clutch blocks and is non-rotatably (Continued)

coupled to the first clutch block, the synchronizer ring is pressed against the second clutch block when the dog clutch is closed.

14 Claims, 2 Drawing Sheets

(56) References Cited

U.S. PATENT DOCUMENTS

| | | |
|---|---|---|
| 2009/0050460 A1 | 2/2009 | Ahn |
| 2009/0050605 A1 | 2/2009 | Ahn |
| 2010/0025215 A1 | 2/2010 | Toba et al. |
| 2017/0343089 A1 | 11/2017 | Bartz et al. |

FOREIGN PATENT DOCUMENTS

| | | | |
|---|---|---|---|
| DE | 102014224405 | * | 6/2016 |
| DE | 102014224405 A1 | | 6/2016 |
| KR | 101050548 B1 | | 7/2011 |
| RU | 2110866 C1 | | 5/1998 |
| RU | 2397570 C2 | | 8/2010 |
| RU | 2398304 C2 | | 8/2010 |
| RU | 2411602 C2 | | 2/2011 |

* cited by examiner

TENSIONING GEAR MECHANISM FOR TENSIONING A STORED-ENERGY SPRING OF A SPRING-TYPE STORED-ENERGY DRIVE

BACKGROUND OF THE INVENTION

Field of the Invention

The invention relates to a tensioning gear mechanism for tensioning a stored-energy spring of a spring-type stored-energy drive, in particular for a circuit-breaker.

Spring-type stored-energy drives are used, in particular, as drives for switching circuit-breakers. Circuit-breakers are electrical switches that are designed for high electric currents and voltages, in order, in particular, to be able to shut down high overload currents and short-circuit currents safely. For this purpose, circuit-breakers exhibit an interrupter unit with at least one movable switching element for opening and closing a current-path. For the purpose of moving the switching elements in the course of a switching operation, circuit-breakers hold energy in readiness that is needed for the switching operation. Spring-type stored-energy drives store this energy in stored-energy springs which are tensioned for the purpose of storing the energy. A stored-energy spring is tensioned with, for instance, a tensioning motor which is connected to the stored-energy spring via a tensioning gear mechanism. Analogously, spring-type stored-energy drives are also used, for instance, as drives for switching load-isolating switches.

SUMMARY OF THE INVENTION

The object underlying the invention is to specify an improved tensioning gear mechanism for tensioning a stored-energy spring of a spring-type stored-energy drive.

In accordance with the invention, the object is achieved by the features of claim 1.

Advantageous configurations of the invention are the subject matter of the dependent claims.

A tensioning gear mechanism according to the invention for tensioning a stored-energy spring of a spring-type stored-energy drive comprises a tensioning wheel coupled to the stored-energy spring, an intermediate shaft coupled to the tensioning wheel, an intermediate wheel capable of being driven by a tensioning motor, a freewheel coupled to the intermediate wheel, a locking mechanism for separable locking of the tensioning wheel in a tensioned state of the stored-energy spring, and a claw coupling which couples the freewheel to the intermediate shaft for the purpose of tensioning the stored-energy spring, and decouples it from the intermediate shaft in the tensioned state of the stored-energy spring. The claw coupling comprises a first coupling jaw coupled to the intermediate shaft in torsion-resistant manner, a second coupling jaw connected to the freewheel, and a synchronizer ring arranged between the coupling jaws and coupled to the first coupling jaw in torsion-resistant manner. The first coupling jaw is displaceable, parallel to a longitudinal axis of the intermediate shaft, between a first end position, in which it abuts the second coupling jaw and which it assumes in the course of the tensioning of the stored-energy spring, and a second end position, in which it has been separated from the second coupling jaw and which it assumes in a tensioned state of the stored-energy spring. The synchronizer ring is pressed against the second coupling jaw when the first coupling jaw is moving from the second end position into the first end position.

In the course of the tensioning of the stored-energy spring, the intermediate shaft transmits rotations of the intermediate wheel to the tensioning wheel via the freewheel and the claw coupling, and thereby enables the tensioning of the stored-energy spring by the tensioning motor which drives the intermediate wheel directly or indirectly. By virtue of the locking mechanism, the tensioning wheel is capable of being locked in the tensioned state of the stored-energy spring, so that the stored-energy spring remains tensioned until the lock is disengaged for the purpose of releasing the energy stored by the stored-energy spring. In the tensioned state of the stored-energy spring, the claw coupling decouples the intermediate shaft from the freewheel and the intermediate wheel, so that no forces are transmitted to the intermediate shaft and the tensioning wheel by the intermediate wheel, in particular when the tensioning motor is coasting. Without the claw coupling, in the tensioned state of the stored-energy spring these forces would be transmitted to the intermediate shaft and components of the tensioning gear mechanism coupled to the intermediate shaft, such as components of the locking mechanism, and would brace and load them. The claw coupling therefore advantageously relieves the load on the intermediate shaft and components of the tensioning gear mechanism coupled to it in the tensioned state of the stored-energy spring.

By virtue of the torsion-resistant coupling of the first coupling jaw to the intermediate shaft, rotations of the intermediate shaft are transmitted to the first coupling jaw. The displaceability of the first coupling jaw enables the coupling thereof to the second coupling jaw and to the freewheel connected thereto for the purpose of tensioning the stored-energy spring, and enables the decoupling of the coupling jaws in the tensioned state of the stored-energy spring.

Prior to the closing of the claw coupling, the second coupling jaw is still stationary, whereas the first coupling jaw is already rotating by virtue of its torsion-resistant coupling to the intermediate shaft. Without the synchronizer ring, the first coupling jaw would suddenly set the second coupling jaw—which up until then had been stationary—in rotation by means of an impulse which may result in wear of the coupling jaws. Since the synchronizer ring is connected to the first coupling jaw in torsion-resistant manner, the pressing of the synchronizer ring against the second coupling jaw when the claw coupling is closing generates a frictional force between the synchronizer ring and the second coupling jaw, which gradually adapts a rotational speed of the second coupling jaw to the rotational speed of the first claw coupling. The synchronizer ring therefore advantageously reduces the loading and wear of the coupling jaws when the claw coupling is closing.

One configuration of the invention provides that the synchronizer ring is displaceable, parallel to the longitudinal axis of the intermediate shaft, relative to the first coupling jaw and is coupled to the first coupling jaw by a spring element which exerts a spring force parallel to the longitudinal axis of the intermediate shaft between the synchronizer ring and the first coupling jaw. This coupling of the synchronizer ring to the first coupling jaw by a spring element enables a gradual increase in the frictional force between the synchronizer ring and the second coupling jaw when the claw coupling is closing by virtue of the increasing spring force of the spring element, and thereby advantageously further damps the closing of the claw coupling.

A further configuration of the invention provides that the synchronizer ring and the second coupling jaw exhibit friction surfaces corresponding to one another which abut one another when the synchronizer ring is being pressed against the second coupling jaw and which have been realized as frustoconical surfaces. The coupling between the synchronizer ring and the second coupling jaw by friction surfaces realized as frustoconical surfaces when the claw coupling is closing advantageously increases the contact force that the friction between the synchronizer ring and the second coupling jaw generates when the synchronizer ring is being pressed against the second coupling jaw.

A further configuration of the invention provides that the first coupling jaw is coupled to the intermediate shaft by a coupling element, the coupling element being guided through a transverse opening in the intermediate shaft extending perpendicular to a longitudinal axis of the intermediate shaft, and being displaceable in the transverse opening between a first position, defining the first end position of the first coupling jaw, and a second position defining the second end position of the first coupling jaw. The coupling element takes the form, for instance, of a tube or bolt, the longitudinal axis of which is arranged perpendicular to the longitudinal axis of the intermediate shaft, and the ends of which project into recesses in the first coupling jaw. The coupling element enables a displacement of the first coupling jaw by a displacement of the coupling element.

Furthermore, a switching pin, for instance, is provided which is displaceably supported in a longitudinal opening in the intermediate shaft extending along the longitudinal axis of the intermediate shaft and which is coupled to the coupling element. As a result, the first coupling jaw can be displaced over the coupling element by displacement of the switching pin between its end positions.

Furthermore, there is provision that, for instance, a resetting end of the switching pin projects out of the longitudinal opening in the intermediate shaft, and a resetting element is arranged on the tensioning wheel, which displaces the resetting end of the switching pin in the tensioned state of the stored-energy spring toward the longitudinal opening, so that the coupling element is displaced from its first position into its second position. For instance, the resetting element exhibits a contact end, protruding radially from the tensioning wheel, with an oblique contact surface which in the course of the displacement of the switching pin abuts the resetting end thereof. By virtue of the resetting element, the tensioning wheel is coupled to the switching pin in a position in which the stored-energy spring has been tensioned, the resetting element displacing the switching pin and thereby opening the claw coupling.

Each of the two coupling jaws preferentially extends in the form of a ring around the intermediate shaft. As a result, a reliable coupling of the claw coupling to the intermediate shaft and to the freewheel is made possible in straightforward manner.

Furthermore, a restoring spring coupled to the first coupling jaw is provided, for instance, which in the second end position of the first coupling jaw exerts a spring force on the first coupling jaw in the direction of the first end position. By virtue of the restoring spring, the first coupling jaw can be pushed from its second end position into the first end position when the resetting element releases the switching pin in the course of the relaxing of the stored-energy spring. As a result, the claw coupling is closed again and the tensioning gear mechanism is ready for renewed tensioning of the stored-energy spring after the relaxing of the stored-energy spring.

The freewheel exhibits, for instance, a freewheel ring extending around the intermediate shaft, to which the second coupling jaw is connected. As a result, a reliable coupling of the claw coupling to the freewheel is made possible.

The intermediate wheel is capable of being driven by the tensioning motor, for instance via a bevel-gear transmission. As a result, a deflection of the propulsive force of the tensioning motor is obtained, which enables a compact design of the spring-type stored-energy drive.

The locking mechanism exhibits, for instance, a cam-disk roller, firmly connected to the tensioning wheel, and a latch which fixes the cam-disk roller for the purpose of locking the tensioning wheel. This enables a reliable separable locking of the tensioning wheel by a simple and inexpensive locking mechanism.

A spring-type stored-energy drive according to the invention exhibits a tensioning gear mechanism according to the invention. The advantages of a spring-type stored-energy drive of such a type result from the aforementioned advantages of a tensioning gear mechanism according to the invention.

The properties, features and advantages, described above, of this invention and also the manner in which they are obtained will become clearer and more clearly comprehensible in connection with the following description of embodiments which will be elucidated in more detail in connection with the drawings. Shown are:

DETAILED DESCRIPTION OF THE INVENTION

Parts corresponding to one another have been provided with the same reference symbols in the figures.

Figure 1:
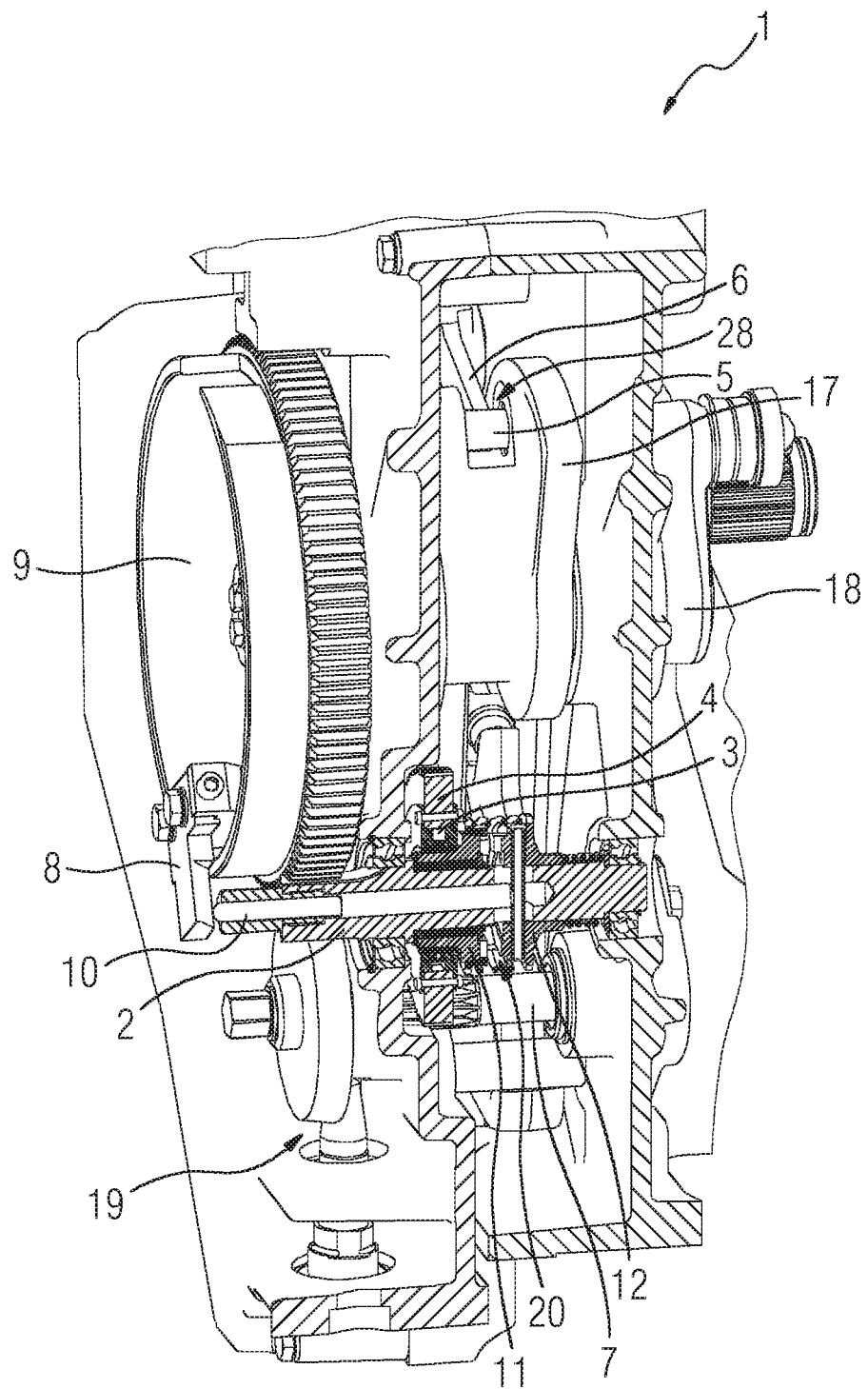
FIG. 1 a perspectival and partially sectioned representation of a tensioning gear mechanism, and FIG. 2 an enlarged detail of FIG. 1.
Figure 2:
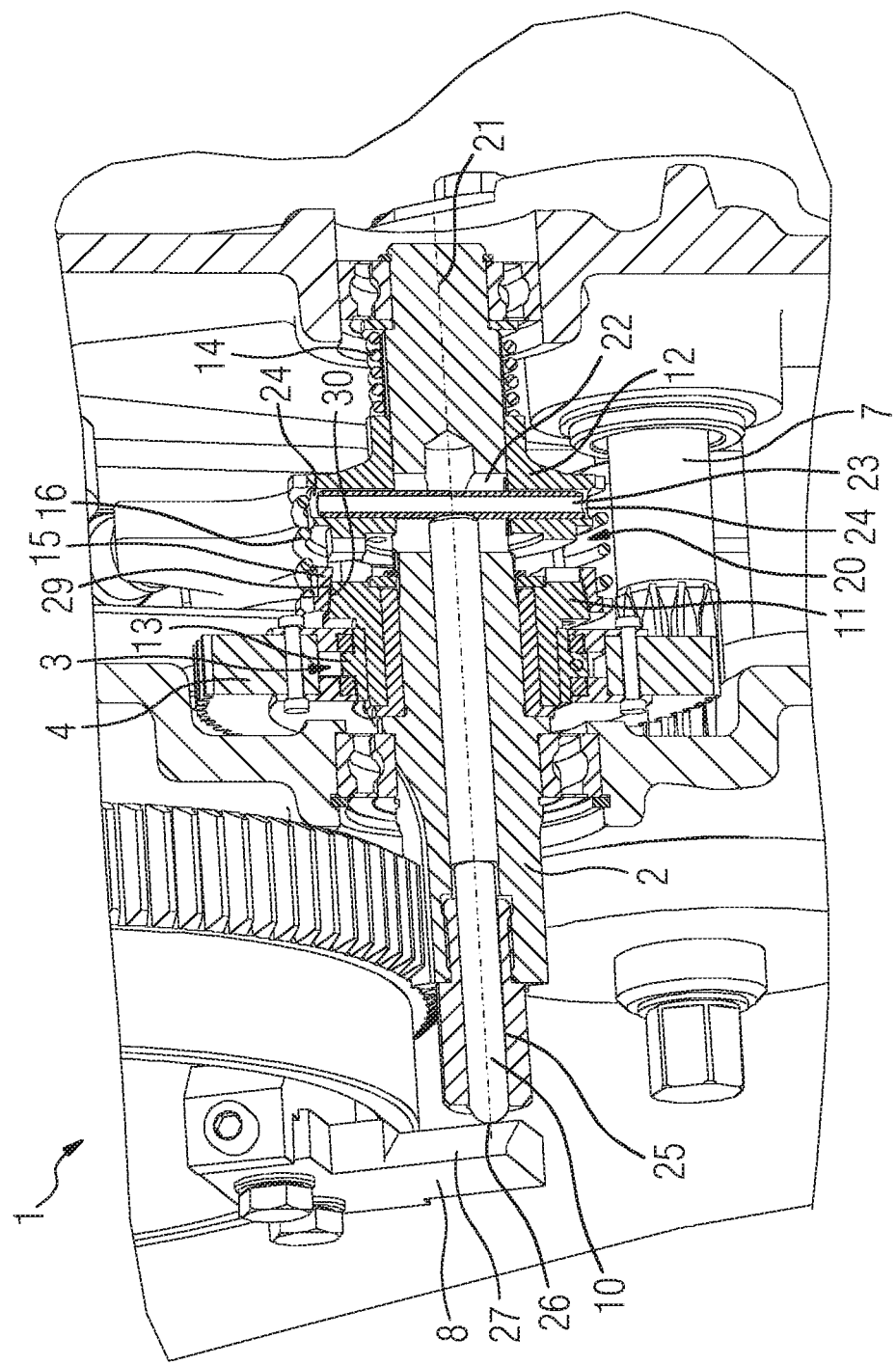

FIGS. 1 and 2 show a tensioning gear mechanism 1 for tensioning a stored-energy spring (not represented) of a spring-type stored-energy drive in a perspectival and partially sectioned representation, FIG. 2 showing an enlarged detail of FIG. 1. The stored-energy spring is, for instance, a circuit-closing spring of the spring-type stored-energy drive, which stores energy for closing a current-path of a circuit-breaker. The tensioning gear mechanism 1 includes, amongst other things, a tensioning wheel 9, an intermediate shaft 2 and an intermediate wheel 4.

The tensioning wheel 9 is firmly connected to a cam disk 17 and to a tensioning shaft 18 and is coupled to the stored-energy spring via the tensioning shaft 18.

The intermediate wheel 4 is capable of being driven by a tensioning motor (not represented) via a bevel-gear transmission 19.

The intermediate shaft 2 is coupled to the tensioning wheel 9 and to the intermediate wheel 4, in order to transmit rotations of the intermediate wheel 4 to the tensioning wheel 9 for the purpose of tensioning the stored-energy spring. The coupling between the intermediate shaft 2 and the tensioning wheel 9 is a gearwheel coupling which is constituted by a ring gear of the tensioning wheel 9 and a gearwheel ring, corresponding thereto, of the intermediate shaft 2.

The intermediate wheel 4 is coupled to the intermediate shaft 2 via a freewheel 3 and a claw coupling 20, the freewheel 3 connecting the intermediate wheel 4 to the claw coupling 20. The claw coupling 20 exhibits a first coupling jaw 12, coupled to the intermediate shaft 2 in torsion-resistant manner, a second coupling jaw 11, connected to an inner ring 13 of the freewheel 3, a synchronizer ring 15 arranged between the coupling jaws 11, 12, and a spring element 16. The coupling jaws 11, 12 and the synchronizer ring 15 each extend in the form of a ring around the intermediate shaft 2.

The first coupling jaw 12 is displaceable axially—that is to say, parallel to a longitudinal axis 21 of the intermediate shaft 2—between a first end position, in which it abuts the second coupling jaw 11 and which it assumes in the course of the tensioning of the stored-energy spring, and a second end position, in which it has been separated from the second coupling jaw 11 and which it assumes in a tensioned state of the stored-energy spring. As a result, the claw coupling 20 couples the freewheel 3 and the intermediate wheel 4 to the intermediate shaft 2 for the purpose of tensioning the stored-energy spring, and decouples the freewheel 3 and the intermediate wheel 4 from the intermediate shaft 2 in the tensioned state of the stored-energy spring.

The synchronizer ring 15 is coupled to the first coupling jaw 12 in torsion-resistant manner and is axially displaceable relative to the first coupling jaw 12. For this purpose, the synchronizer ring 15 exhibits, for instance, axially extending teeth which project into corresponding recesses in the first coupling jaw 12. Or the first coupling jaw 12 exhibits axially extending teeth which project into corresponding recesses in the synchronizer ring 15. Other torsion-resistant but axially displaceable connections of the synchronizer ring 15 to the first coupling jaw 12 are likewise possible. The spring element 16 extends between the first coupling jaw 12 and the synchronizer ring 15 in the form of a spiral around the intermediate shaft 2, so that the tensioned spring element 16 exerts an axially acting spring force between the synchronizer ring 15 and the first coupling jaw 12.

The synchronizer ring 15 is pressed against the second coupling jaw 11 by the spring element 16 when the first coupling jaw 12 is moving from the second end position into the first end position. The synchronizer ring 15 and the second coupling jaw 11 exhibit mutually corresponding friction surfaces 29, 30 which abut one another when the synchronizer ring 15 is being pressed against the second coupling jaw 11 and which have been realized as frusto-conical surfaces.

The freewheel 3 decouples the intermediate wheel 4 from the intermediate shaft 2 in the course of the tensioning of the stored-energy spring when the tensioning shaft 18 runs over an upper dead-center position.

In order to couple the first coupling jaw 12 to the intermediate shaft 2 in torsion-resistant and axially displaceable manner, the first coupling jaw 12 and the intermediate shaft 2 exhibit a toothed system, for instance.

In order to displace the first coupling jaw 12 from its first end position into the second end position, the intermediate shaft 2 exhibits in the region of the first coupling jaw 12 an elongated-hole-like transverse opening 22 which extends through the intermediate shaft 2 perpendicular to the longitudinal axis 21. A coupling element 23 connected to the first coupling jaw 12, which is displaceable in the transverse opening 22 between a first position, defining the first end position of the first coupling jaw 12, and a second position, defining the second end position of the first coupling jaw 12, is guided through the transverse opening 22. In the embodiment represented in the figures, the coupling element 23 takes the form of a tube, the ends of which project into recesses 24 in the first coupling jaw 12. But alternatively the coupling element 23 may also have been realized as a bolt, for instance.

Furthermore, the intermediate shaft 2 exhibits a longitudinal opening 25 extending along its longitudinal axis 21, which extends from the transverse opening 22 to an end of the intermediate shaft 2 on the tensioning-wheel side. A switching pin 10, which exhibits a resetting end 26 projecting out of the longitudinal opening 25 and which extends in the longitudinal opening 25 as far as the coupling element 23, is supported so as to be axially displaceable in the longitudinal opening 25.

On the tensioning wheel 9 a resetting element 8 is arranged which displaces the resetting end 26 of the switching pin 10 toward the longitudinal opening 25 in the tensioned state of the stored-energy spring, so that the coupling element 23 is displaced from its first position into its second position. The resetting element 8 exhibits a contact end, protruding radially from the tensioning wheel 9, with an oblique contact surface 27 which in the course of the displacement of the switching pin 10 abuts the resetting end 26 thereof. The resetting element 8 is arranged, for instance, at a position on the tensioning wheel 9 in which the contact surface 27 contacts the resetting end 26 of the switching pin 10 when the tensioning wheel 9 has rotated approximately three degrees further after the tensioning shaft 18 has reached the upper dead-center position.

Furthermore, a restoring spring 14, which extends in the manner of a spiral around the intermediate shaft 2, is coupled to the first coupling jaw 12. The restoring spring 14 engages an end of the first coupling jaw 12 facing away from the second coupling jaw 11, and in the second end position of the first coupling jaw 12 exerts a spring force on the first coupling jaw 12 in the direction of the first end position.

The tensioning gear mechanism 1 exhibits, in addition, a locking mechanism 28 for separable locking of the tensioning wheel 9 in the tensioned state of the stored-energy spring. The locking mechanism 28 of the embodiment shown in the figures exhibits a cam-disk roller 5, arranged on the cam disk 17, and a latch 6 which fixes the cam-disk roller 5 for the purpose of locking the tensioning wheel 9. After the separation of the coupling jaws 11, 12, the cam-disk roller 5 runs against the latch 6 and is locked in this position by the latch 6, for instance when the tensioning wheel 9 has rotated approximately ten degrees further after the tensioning shaft 18 has reached the upper dead-center position. In this process, a rebounding of the cam-disk roller 5 from the latch 6 is prevented by the freewheel 3 and by a return stop on an additional shaft 7 coupled to the intermediate wheel 4.

Since the coupling jaws 11, 12 have been separated from one another in the tensioned state of the stored-energy spring, the intermediate shaft 2 and components coupled thereto—such as the latch 6 and the cam-disk roller 5—are decoupled from the intermediate wheel 4 in the tensioned state of the stored-energy spring and are not loaded and braced by the intermediate wheel 4, for instance when the tensioning motor is coasting. As a result, in particular the loading of the latch 6, of the cam-disk roller 5 and of the freewheel 3 is advantageously reduced, and wear or damage to these components of the tensioning gear mechanism 1 by this loading is prevented.

For the purpose of releasing the energy stored in the tensioned stored-energy spring, the coupling of the latch 6 to the cam-disk roller 5 is disengaged. The relaxing stored-energy spring rotates the tensioning wheel 9 in one and the same direction of rotation as in the course of the tensioning of the stored-energy spring, as a result of which the resetting element 8 releases the switching pin 10 again and the first coupling jaw 12 is pushed by the restoring spring 14 from the second end position into the first end position, so that the claw coupling 20 is closed again. In this process, the synchronizer ring 15 is pressed against the second coupling jaw 11 by the spring element 16. The pressing of the synchronizer ring 15 against the second coupling jaw 11 generates a friction between the friction surface 29 of the synchronizer ring 15 and the friction surface 30 of the second coupling jaw 11. The frictional force between the synchronizer ring 15 and the second coupling jaw 11 that is generated by this friction gradually adapts a rotational speed of the second coupling jaw 11 to the rotational speed of the synchronizer ring 15 and of the first claw coupling 12. After the closing of the claw coupling 20, the tensioning gear mechanism 1 is ready for renewed tensioning of the stored-energy spring.

Although the invention has been illustrated and described in detail by means of preferred embodiments, the invention is not restricted by the disclosed examples, and other variations can be derived therefrom by a person skilled in the art without departing from the scope of protection of the invention.

The invention claimed is:

1. A tensioning gear mechanism for tensioning a stored-energy spring of a spring-type stored-energy drive, the tensioning gear mechanism comprising:
    a tensioning wheel coupled to the stored-energy spring;
    an intermediate shaft coupled to said tensioning wheel;
    an intermediate wheel capable of being driven by a tensioning motor;
    a freewheel coupled to said intermediate wheel;
    a locking mechanism for separable locking of said tensioning wheel in a tensioned state of the stored-energy spring;
    a claw coupling having a first coupling jaw coupled to said intermediate shaft in a torsion-resistant manner, and a second coupling jaw connected to said freewheel;
    a synchronizer ring disposed between said first and second coupling jaws and coupled to said first coupling jaw in torsion-resistant manner;
    said first coupling jaw being displaceable, parallel to a longitudinal axis of said intermediate shaft, between a first end position, in which said first coupling jaw abuts said second coupling jaw and which it assumes in a course of the tensioning of the stored-energy spring, and a second end position, in which said first coupling jaw has been separated from said second coupling jaw and which it assumes in the tensioned state of the stored-energy spring; and
    said synchronizer ring is pressed against said second coupling jaw when said first coupling jaw is moving from the second end position into the first end position.

2. The tensioning gear mechanism according to claim 1, further comprising a spring element; and
    said synchronizer ring is displaceable, parallel to the longitudinal axis of said intermediate shaft, relative to said first coupling jaw and is coupled to said first coupling jaw by said spring element which exerts a spring force parallel to the longitudinal axis of said intermediate shaft between said synchronizer ring and said first coupling jaw.

3. The tensioning gear mechanism according to claim 1, wherein said synchronizer ring and said second coupling jaw have mutually corresponding friction surfaces which abut one another when said synchronizer ring is being pressed against said second coupling jaw and which have been realized as frustoconical surfaces.

4. The tensioning gear mechanism according to claim 2, further comprising a coupling element;
    wherein said intermediate shaft has a transverse opening formed therein and extending perpendicular to the longitudinal axis of said intermediate shaft; and
    wherein said first coupling jaw is coupled to said intermediate shaft by said coupling element, said coupling element being guided in said intermediate shaft through said transverse opening extending perpendicular to the longitudinal axis of said intermediate shaft, and is displaceable in said transverse opening, parallel to the longitudinal axis of said intermediate shaft, between a first position, defining the first end position of said first coupling jaw, and a second position defining the second end position of said first coupling jaw.

5. The tensioning gear mechanism according to claim 4, wherein:
    said first coupling jaw has recesses formed therein; and
    said coupling element is a tube or a bolt, a longitudinal axis of said coupling element is disposed perpendicular to the longitudinal axis of said intermediate shaft, and said coupling element has ends which project into said recesses in said first coupling jaw.

6. The tensioning gear mechanism according to claim 4, wherein said intermediate shaft has a longitudinal opening formed therein and extending along the longitudinal axis of said intermediate shaft; and
    further comprising a switching pin supported so as to be displaceable in said intermediate shaft in said longitudinal opening extending along the longitudinal axis of said intermediate shaft and said switching pin is coupled to said coupling element.

7. The tensioning gear mechanism according to claim 6, wherein said switching pin has a resetting end which projects out of the longitudinal opening; and
    further comprising a resetting element disposed on said tensioning wheel, said resetting element displaces said resetting end of said switching pin in the tensioned state of the stored-energy spring toward the longitudinal opening, so that said coupling element is displaced from a first position into a second position.

8. The tensioning gear mechanism according to claim 7, wherein said resetting element has a contact end, protruding radially from said tensioning wheel, with an oblique contact surface which in a course of a displacement of said switching pin abuts said resetting end of said switching pin.

9. The tensioning gear mechanism according to claim 1, wherein said first and second coupling jaws each extend in a form of a ring around said intermediate shaft.

10. The tensioning gear mechanism according to claim 1, further comprising a restoring spring coupled to said first coupling jaw, said restoring spring in the second end position of said first coupling jaw exerts a spring force on said first coupling jaw in a direction of the first end position.

11. The tensioning gear mechanism according to claim 1, wherein said freewheel has a freewheel ring extending around said intermediate shaft, and said second coupling jaw is connected to said freewheel ring.

12. The tensioning gear mechanism according to claim 1, wherein said intermediate wheel is capable of being driven by the tensioning motor via a bevel-gear transmission.

13. The tensioning gear mechanism according to claim 1, wherein said locking mechanism has a cam-disk roller, firmly connected to said tensioning wheel, and a latch which fixes said cam-disk roller for locking said tensioning wheel.

14. A spring-type stored-energy drive, comprising:
a stored energy spring; and
a tensioning gear mechanism, containing:
- a tensioning wheel coupled to said stored-energy spring;
- an intermediate shaft coupled to said tensioning wheel;
- an intermediate wheel capable of being driven by a tensioning motor;
- a freewheel coupled to said intermediate wheel;
- a locking mechanism for separable locking of said tensioning wheel in a tensioned state of said stored-energy spring;
- a claw coupling with a first coupling jaw coupled to said intermediate shaft in a torsion-resistant manner, with a second coupling jaw connected to said freewheel;
- a synchronizer ring disposed between said first and second coupling jaws and coupled to said first coupling jaw in torsion-resistant manner;
- said first coupling jaw being displaceable, parallel to a longitudinal axis of said intermediate shaft, between a first end position, in which said first coupling jaw abuts said second coupling jaw and which it assumes in a course of the tensioning of said stored-energy spring, and a second end position, in which said first coupling jaw has been separated from said second coupling jaw and which it assumes in the tensioned state of said stored-energy spring; and
- said synchronizer ring is pressed against said second coupling jaw when said first coupling jaw is moving from the second end position into the first end position.

* * * * *